United States Patent [19]

Skewis et al.

[11] 3,736,672
[45] June 5, 1973

[54] READING MACHINE FOR THE BLIND

[76] Inventors: John B. Skewis, 2427 Alvin Street, Mountain View, Calif. 94040; James Y. Lawrie, 145 Johnson Avenue, Los Gatos, Calif. 95030

[22] Filed: Dec. 29, 1971

[21] Appl. No.: 213,449

[52] U.S. Cl. ................................................35/35 A
[51] Int. Cl. ............................................G09b 21/00
[58] Field of Search ..........................35/35 A, 38, 1; 197/6.1

[56] References Cited

UNITED STATES PATENTS 2,521,338  9/1950  Bryce et al............................35/35 A
2,039,406  5/1936  Greensfelder..................35/35 A UX
1,921,000  8/1933  Naumburg..........................35/35 A

*Primary Examiner*—Wm. H. Grieb
*Attorney*—Arlington C. White

[57] ABSTRACT

Equipment which assembles and presents upon a controlled moving belt a succession of raised replicas of characters delineated on a sheet to enable the reading of any work by a blind person by tactual sensing of the raised replicas of the characters as presented in the same order and spacing on said belt as on such sheet.

10 Claims, 21 Drawing Figures

INVENTORS
JOHN B. SKEWIS
JAMES Y. LAWRIE
BY
*Arlington L. White*
ATTORNEY

INVENTORS
JOHN B. SKEWIS
JAMES Y. LAWRIE
BY
Arlington G. White
ATTORNEY

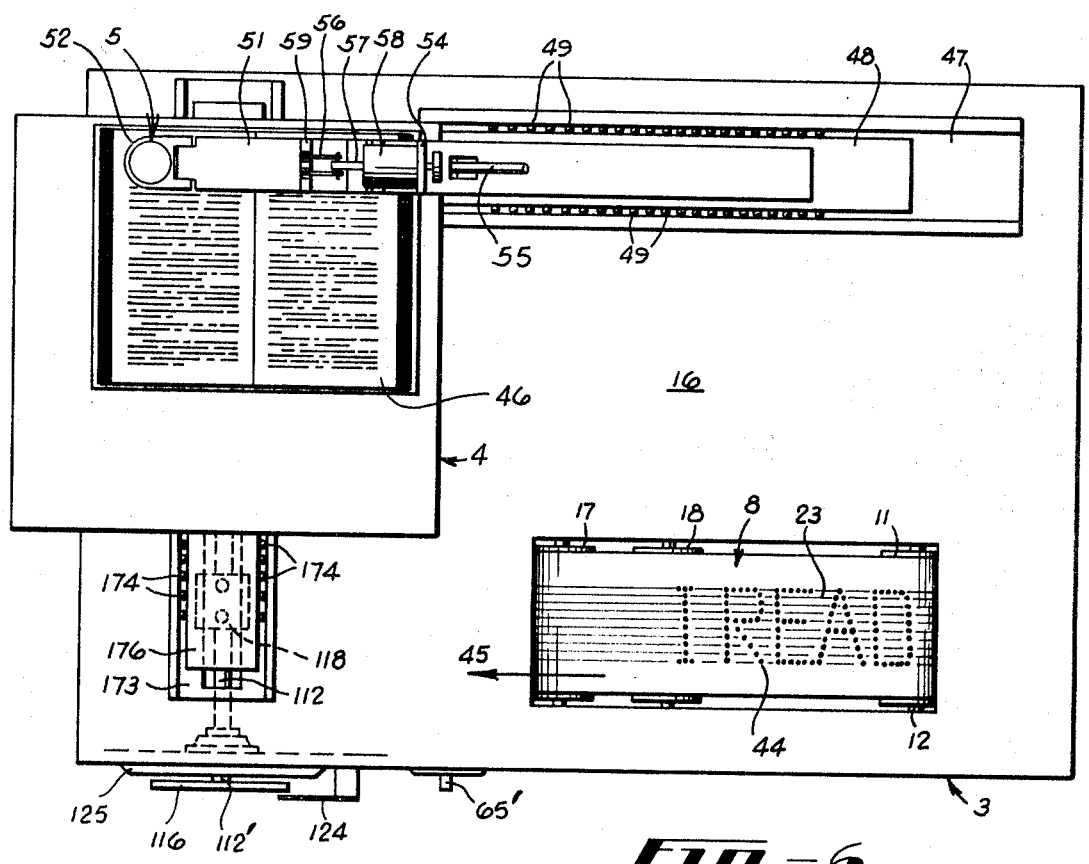
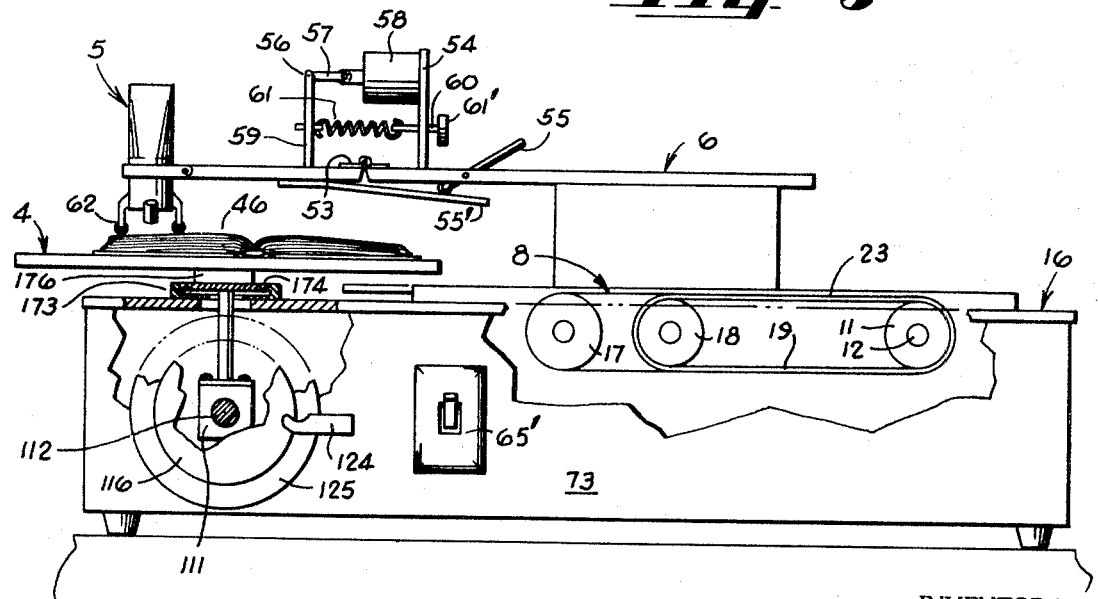

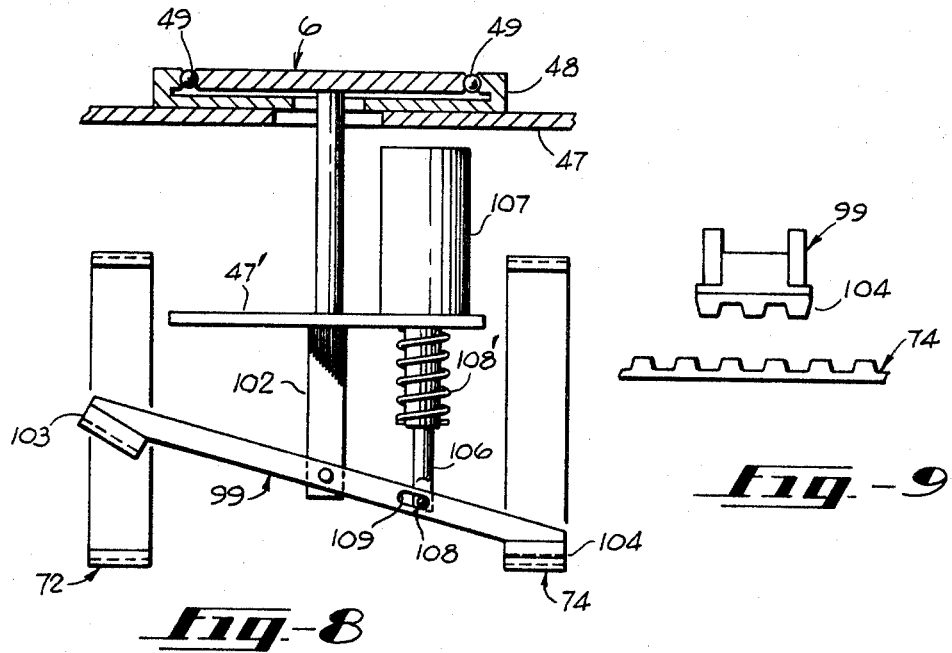
Fig.-8
Fig.-9
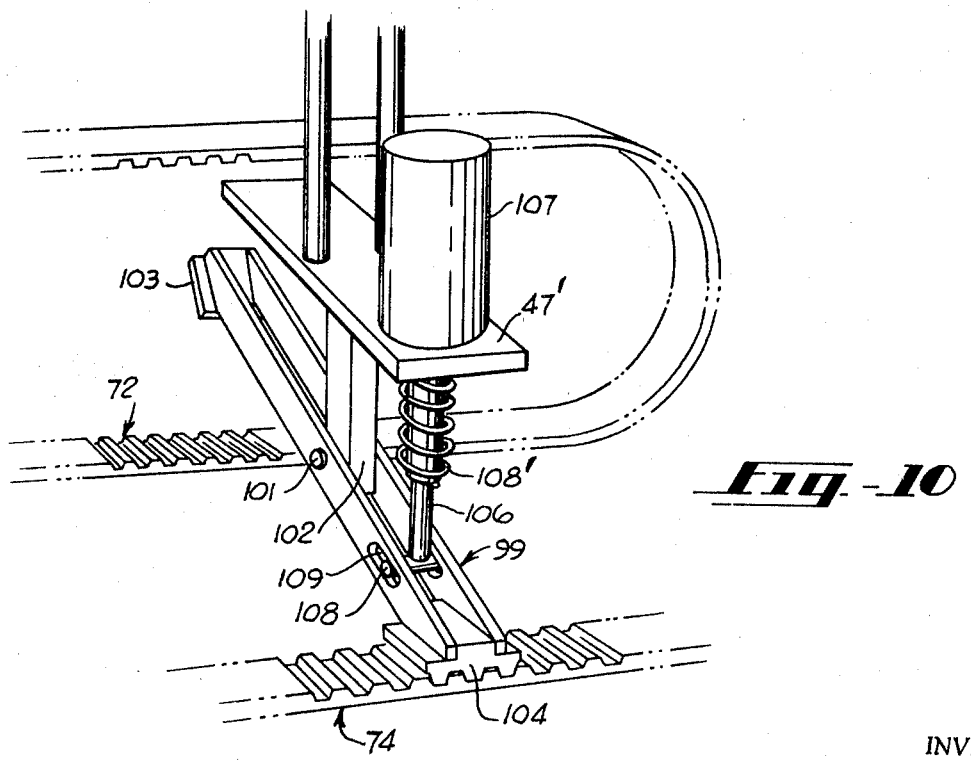
Fig.-10

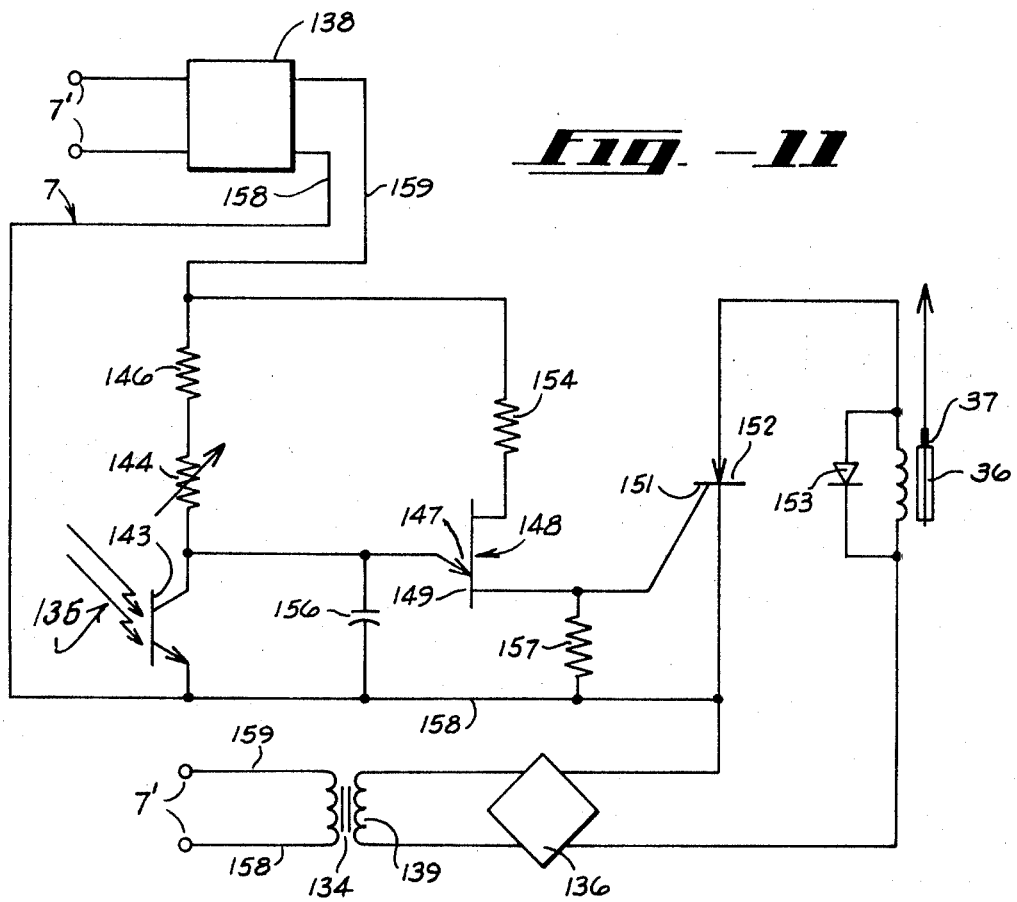
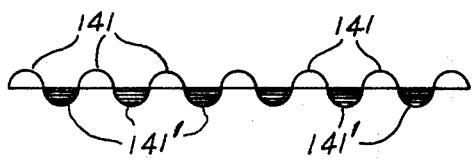
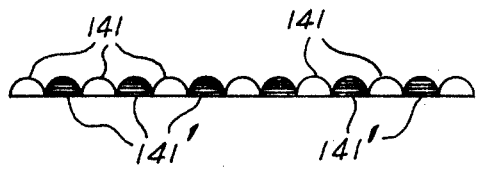

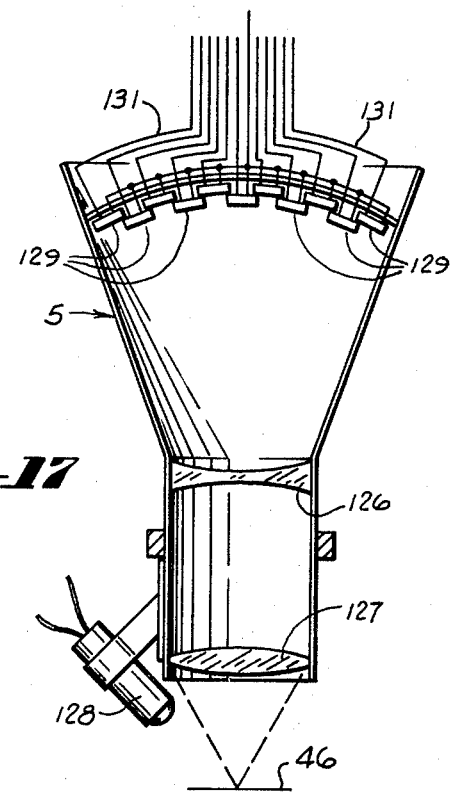
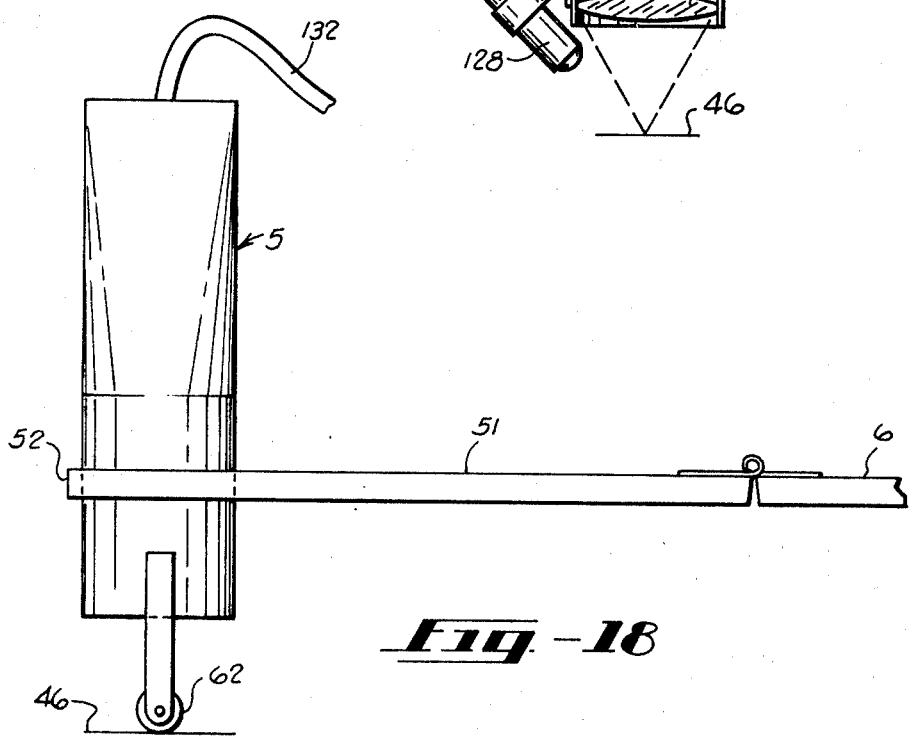

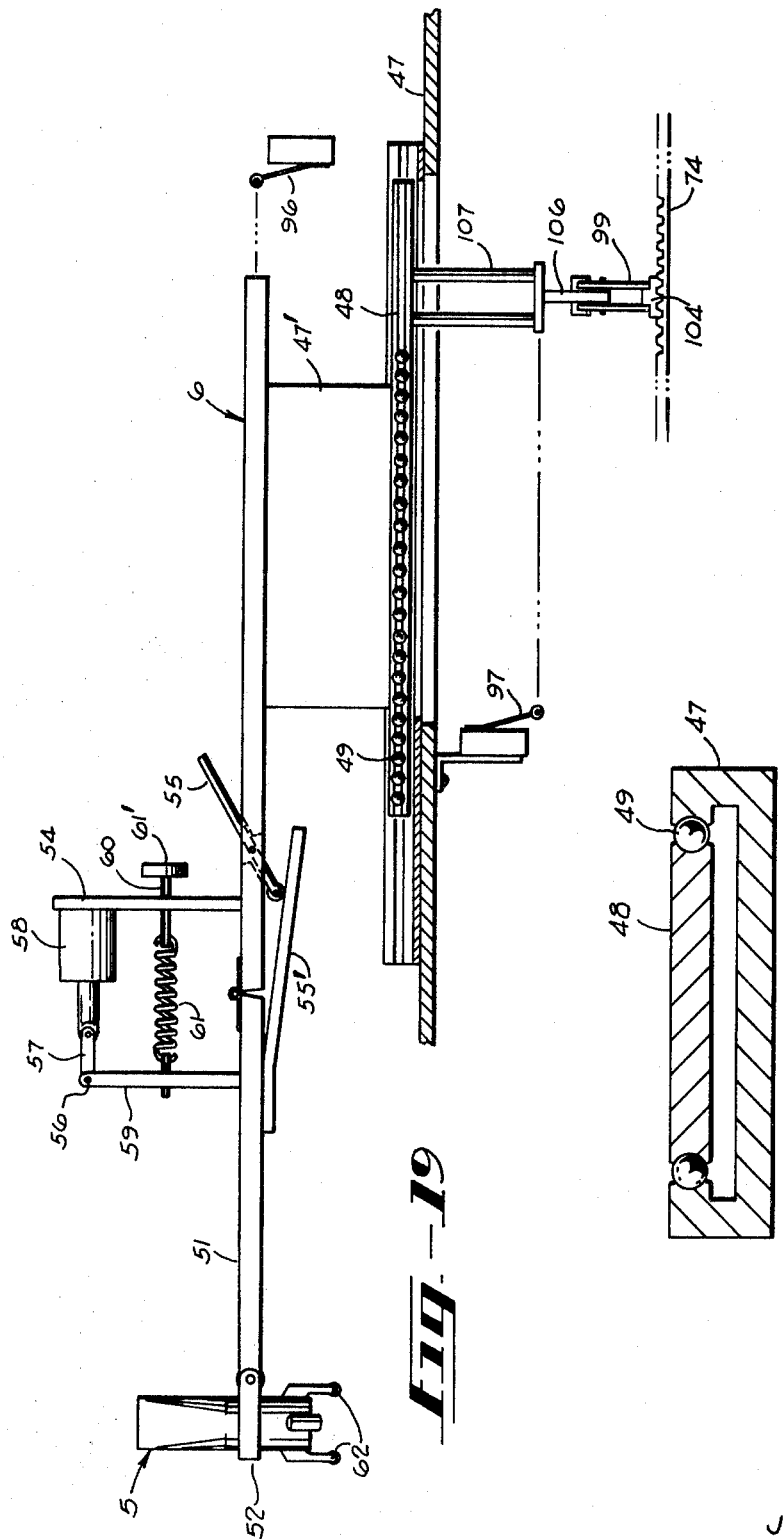

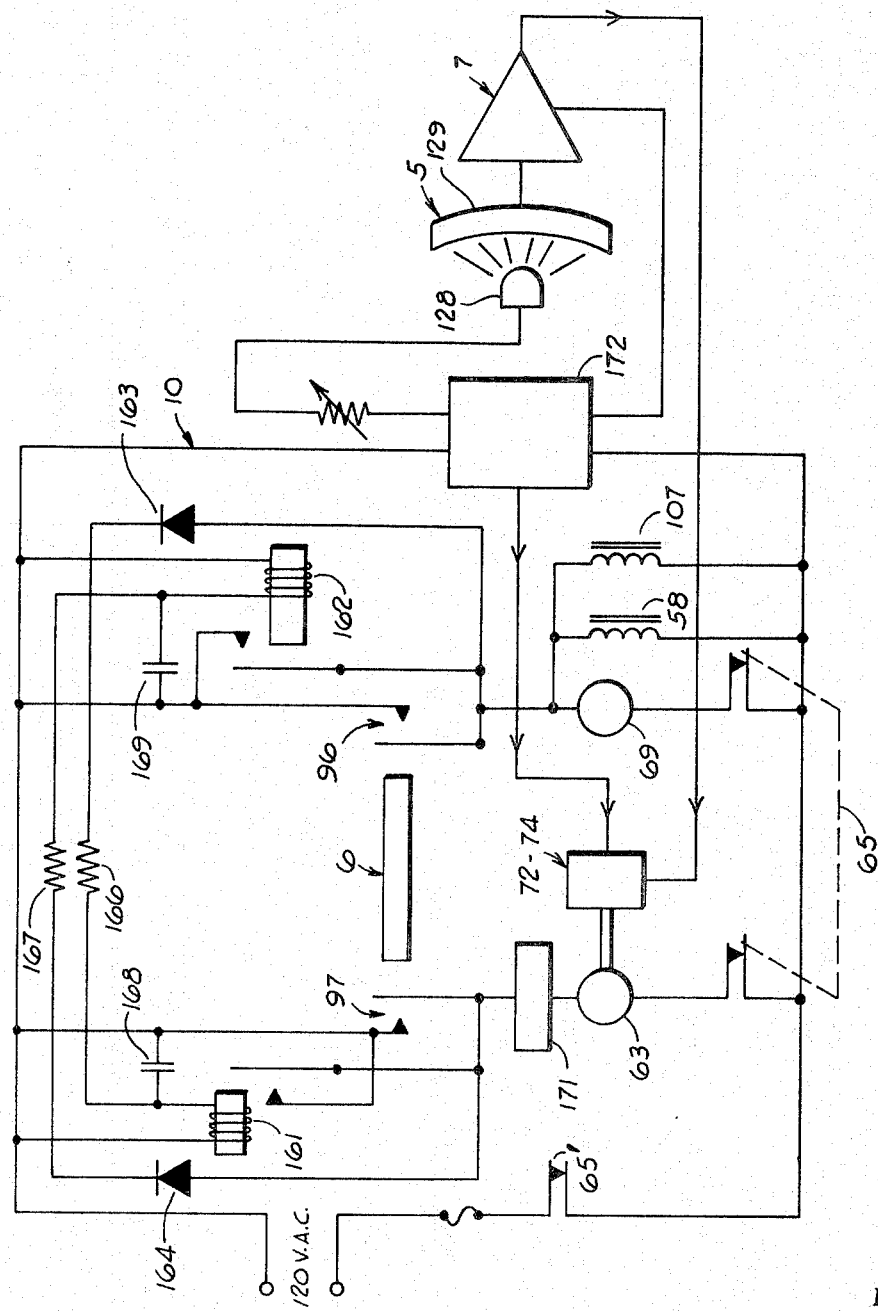

READING MACHINE FOR THE BLIND

It is to be understood that the word "characters" as used herein connotes and includes not only alphabetical letters in any and every language as well as numerals of all kinds and symbols consisting of such various text symbols as commas, semi-colons, colons, parentheses, quotation marks, punctuation marks of all kinds, mathematical and chemical symbols and the like which are commonly used and found in printed, graphic or otherwise produced or reproduced matter. Further, it is to be understood that the word "delineated" as used herein in reference to characters includes printed delineations employing printer's inks, paint or other pigments, chalk, crayon or other marking substances whereby color contrasting matter can be exhibited.

Reading machines for the blind which have heretofore been conceived are, in general, incapable of mobility and do not afford rapid and facile tactile sensing. Moreover, prior machines of this general character are incapable of presenting more than one individual character at a time which raises a serious problem for the blind person of remembering and retaining the individual characters for subsequent recall and assimulation. Our present invention is directed to the provision of mobile equipment which obviates all of the disadvantages of prior reading machines for the blind, and which is easily operable and capable of assembling a series of replicas of delineated characters at substantially the same time for ready tactual sensing.

Our invention, in general, relates to the art of reproduction and more particularly relates to combined photoelectronic and electro-mechanical means for producing replicas of delineated characters in any work upon an operator-controlled moving belt for tactual sensing.

A primary object of our present invention is to provide an improved reading machine for the blind which is positive in operation; which may be easily operated under the sole control of a blind person; and which enables ready tactual sensing of a succession of assembled replicas of delineated characters contained in any work in any language.

Another important object of the invention is to provide an improved reading machine for the blind of the indicated nature which is additionally characterized by its simplicity of construction, operation and maintenance and consequent inexpensive manufacture with low cost to maintain.

A still further object of out invention is to provide an improved reading machine for the blind of the aforementioned character which is sanitary as well as safe to use by a plurality of different blind persons.

Another important object of the invention is to provide equipment of the aforementioned character which enables blind people to read current news media, magazines and other works and which does not require the employment of Braille or other special type for tactual sensing.

Other objects of the invention, together with some of the advantageous features thereof, will appear from the following description of the best mode of construction thereof and the manner of using the invention, as illustrated in the accompanying drawings. It is to be understood that we are not to be limited to the precise embodiment thereof nor to the precise components or arrangement of the components as shown since the invention as defined in the appended claims is intended to cover the embodiment illustrated as well as modifications thereof within the purview of our concept.

Referring to the drawings.

Figure 1:
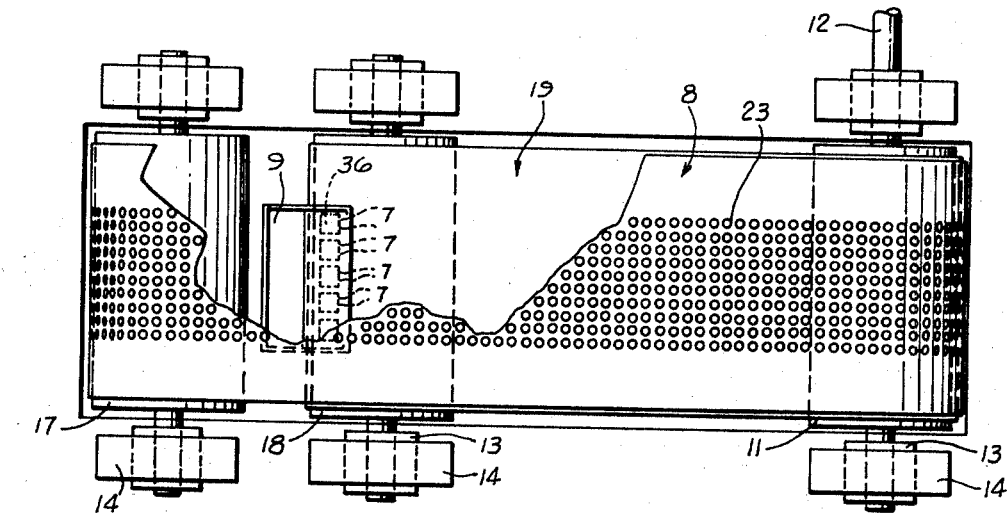
FIG. 1 is a top plan view of a perforated endless belt component of an embodiment of our invention, as mounted for rotation, part thereof being broken away to illustrate an underlying drive belt and hopper for carrying replica building spheres.
Figure 2:
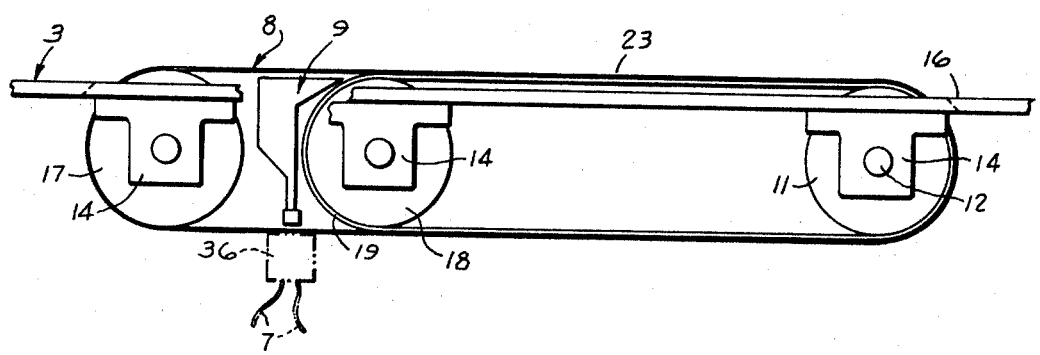
FIG. 2 is a fragmentary side elevational view of the housing and supported components shown in FIG. 1, this view also schematically illustrating in dotted lines one of the actuatable solenoids and in solid lines its armature for controlling the retention and periodic release of balls from the outlet of each hopper compartment for reception in the perforations of the endless belt.
Figure 3:
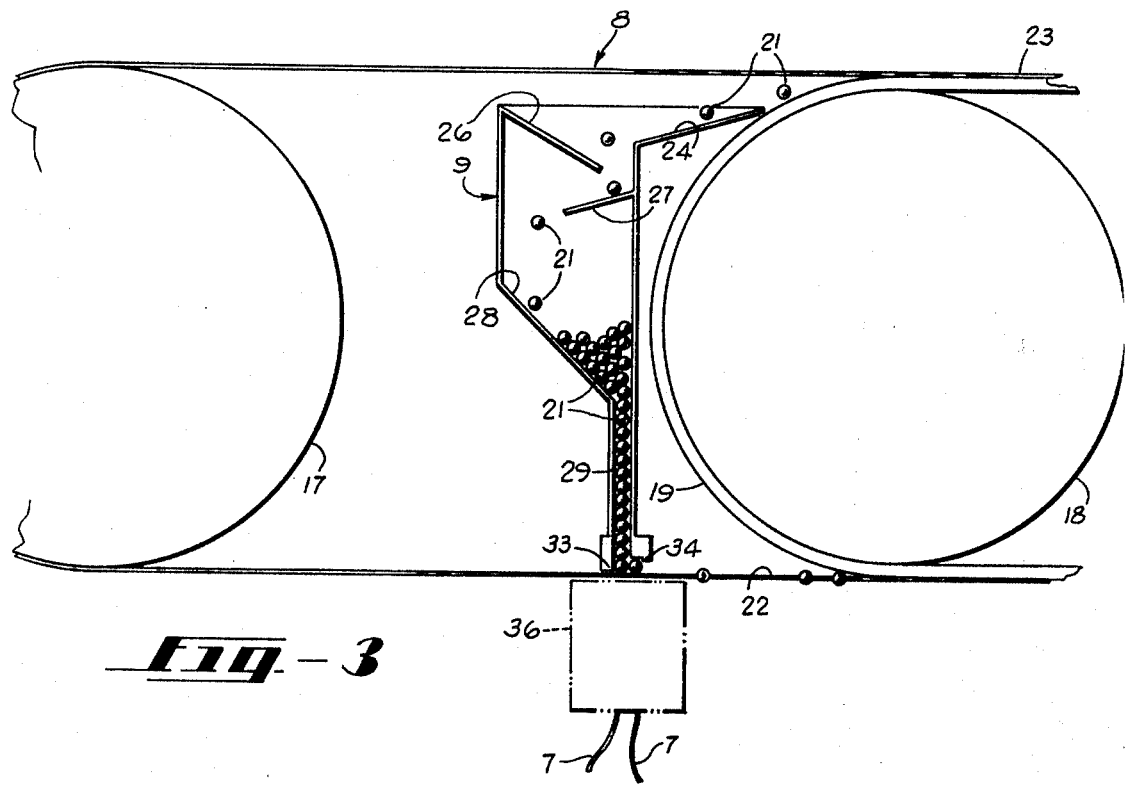

FIG. 3 is an enlarged fragmentary side elevational view of portions of the lower reach and upper reach of the perforated belt component shown in FIGS. 1 and 2; this view also showing one of the partially filled compartments of a ball-retaining hopper with a dotted line schematic showing of one of the actuatable solenoids controlling the retention and release of balls from the hopper onto the lower reach of the endless belt component of the machine, and also illustrating a portion of a drive belt in underlying engagement with the upper reach of the belt and in overlying engagement with the lower reach of the endless belt for temporarily retaining the balls in the perforations of the endless belt for tactual sensing.

Figure 4:
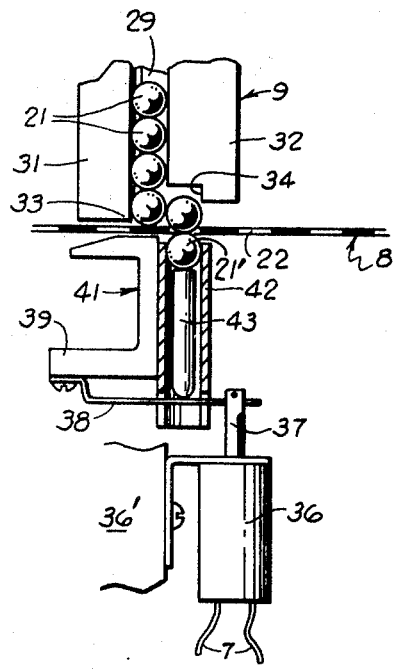

FIG. 4 is an enlarged fragmentary elevational view of the outlet end of a compartment of the ball-retaining hopper arranged in close proximity to the lower reach of the perforated belt component of the machine and illustrating one of the actuatable solenoids employed, this view showing the armature of the solenoid in extended position to retain the balls in the compartment prior to energization of the solenoid.

Figure 5:
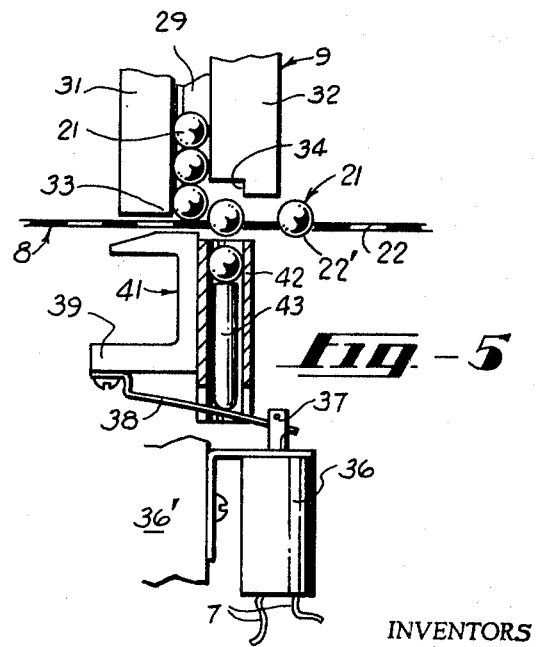

FIG. 5 is a view corresponding to FIG. 4 but with the armature of the solenoid retracted to allow release of balls from the hopper and reception thereof on the lower reach of the endless perforated belt.

FIG. 6 is a top plan view of the portable machine of our present invention with the principal components comprising the work holder, the scanning mechanism and the endless perforated belt at rest positions and in their relative assembly to one another as embodied in our present machine.

FIG. 7 is a side elevation view of the machine shown in FIG. 6, part of the casing being broken away to illustrate a portion of the drive means for the scanning mechanism; this view illustrating the movable mounting of the work holder and schematically illustrating a control dial for adjusting the work holder in relation to the scanning mechanism for line to line scanning of the delineated characters in works having different number of lines of characters per inch.

FIG. 8 is an elevational view of the mechanism for controlling the motion of the scanning unit in either direction by the selective engagement of the shoes shown in FIG. 9 into one or the other of the counter rotating belts.

FIG. 9 is an enlarged exploded detail of certain of the elements contained in the scanning drive mechanism.

FIG. 10 is a fragmentary end elevational view of the mechanism illustrated in FIGS. 8 and 9.

FIG. 11 is a diagrammatic wiring diagram with connected transistors, resistors and rectifier components of one of the series of amplifier circuits associated with the sensor head and photo-transistor components thereof for recurrently actuating each of the solenoids controlling the release of balls from the ball-retaining hopper illustrated in FIGS. 3–5 inclusive.

FIG. 12 is a schematic view of a sine wave form ensuing from alternating current transformer before rectification.

FIG. 13 is a schematic view of the wave form resulting from the pulsing direct current output of the rectifier circuit illustrated in FIG. 11 which is employed in the embodiment of our invention illustrated in the accompanying drawings.

Figure 14:
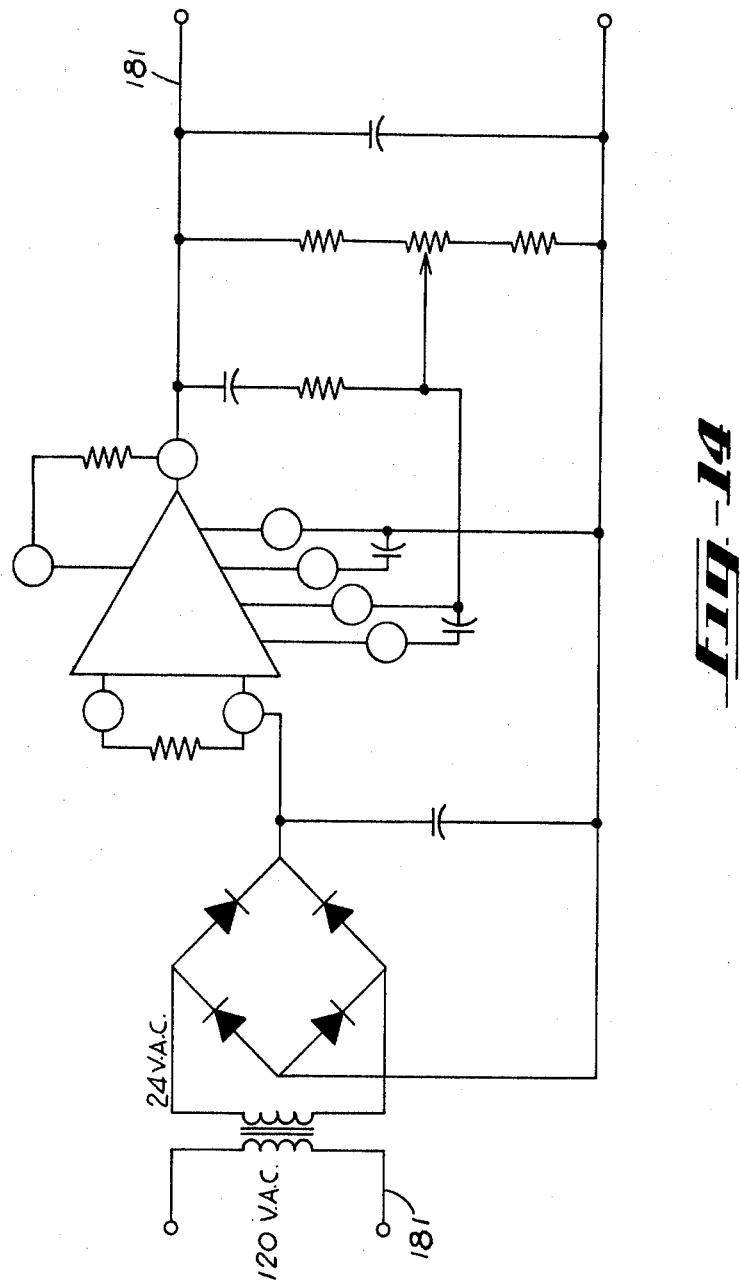

FIG. 14 is a diagrammatic view of a 20 volt direct current regulated power supply employed in the embodiment of our invention shown in the annexed drawings and which is associated with a corresponding photo-transistor optical circuit connected to the sensor head as well as associated with one of the amplifier circuits illustrated in FIG. 11.

Figure 15:
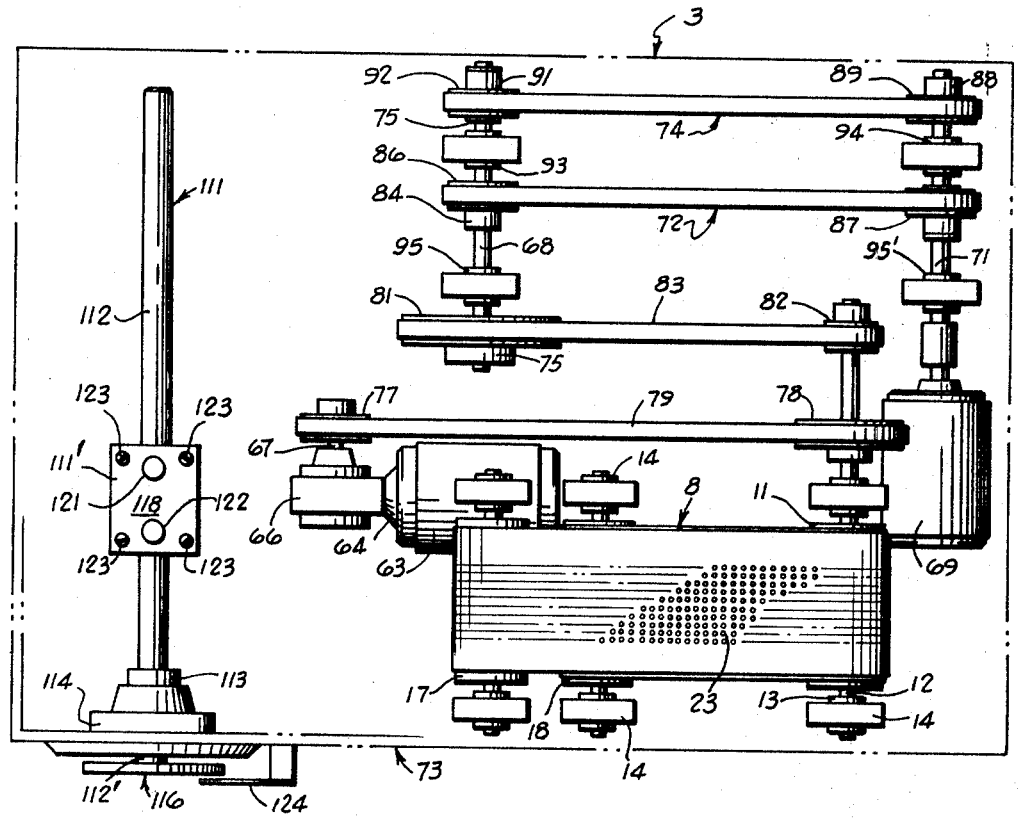

FIG. 15 is a top plan view, with cover and work-holder removed of the portable machine of our invention illustrated in the drawings; this view illustrating the drive means for the perforated endless belt with gear reduction drive units for the sensor head platform and linear actuator for the work-holder and associated manual control dial for adjusting work holder movement for various line arrangements of delineated characters in different works.

Figure 16:
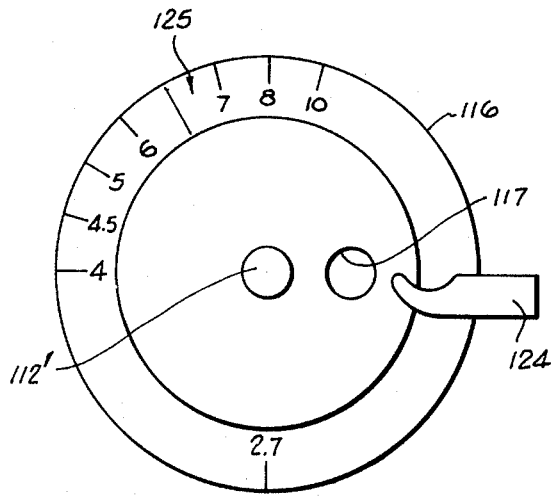

FIG. 16 is a plan view of the line to line adjustment dial shown in FIG. 19 for varying the movement of the work-holder to accommodate for the different line to line arrangements of delineated characters in works set up to be tactually sensed by a blind person.

FIG. 17 is an elevational view of a fan-shaped sensor head including lenses and excitor lamps as well as individual photo-transistors and fragmentary portions of associated individual conductors for transmitting light energy to the components of the amplifier circuits illustrated in FIG. 11.

FIG. 18 is an elevational view of the pivotally mounted sensor head with depending casters which ride across the work when the sensor head is lowered to operating position and moved across the work, this view illustrating in fragmentary showing a cable in which the light conductors from the photo-transistors are carried.

FIG. 19 is a schematic longitudinal view of the sensor head carriage and mounting platform therefor and mechanism for effecting linear movement of the sensor head.

FIG. 20 is an end view of the mounting element for the sensor head carriage with ball bearings for facile sliding of the carriage in opposite linear directions.

FIG. 21 is a diagrammatic view of the interconnecting alternating current circuit; this view showing in block diagram the sensor head with limit switches at opposite extreme limits of the linear movement of the sensor during scanning of the delineated characters in the successive lines of a work.

In the embodiment illustrated in the accompanying drawings constituting views of the best mode of construction of the invention and showing the manner of using the same, it is clear that our present invention comprises, in combination with a movable photo-optical sensor unit containing a plurality of photo-transistors, communicating with a like number of light conductors, as well as in combination with a like number of amplifier circuits activated by light energy transmitted by said light conductors and each containing an actuatable solenoid, a portable case housing and supporting all of the machine components, a work or text holder underlying said photo-optical sensor and movably mounted on said case, together with an endless perforated belt journaled on said casing, a hopper underlying the end of a predetermined section of said endless perforated belt for receiving and releasably-retaining a multiplicity of balls some of which are disposable and temporarily retained in the perforations of said belt when selectively released and disposed in predetermined assembled relationship on said belt in response to the re-energization of said solenoids, and means for recurrently moving said photo-sensor and said endless belt to enable scanning the lines of said text and temporarily assembling replicas of the delineated characters thereon in a read-out section of said perforated belt for tactual sensing by a blind person.

In accordance with our present invention, we provide an improved reading machine for the blind which, as hereinabove indicated, comprises seven principal components consisting of a portable case, a work or text holder, a photo-sensor unit with associated light conductors, a carriage for the photo-sensor unit, amplifier circuits with associated solenoids, an endless perforated belt with read-out section, a hopper for releasably-retaining character-building balls, and an interconnection electrical control circuit which are generally designated, respectively, by the reference numerals 3, 4, 5, 6, 7, 8 and 9 and 10 in the accompanying drawings. The portable case 3 may be fabricated of wood, metal or any suitable light in weight plastic material and conveniently houses and supports the aforementioned principal components compactly and in serviceable assembly for the convenience of the blind operator who may employ the machine under his sole control.

As particularly illustrated in FIGS. 1, 2, 6 and 7 of the annexed drawings, the endless perforated belt 8 is mounted for rotation on a drive drum 11 fixedly secured to a driven shaft 12 which is journaled in suitable bearings 13 secured in brackets 14 attached to the under side of the top 16 of the case 3; and we provide an end drum 17 suitably journaled in case 3 as well as an intermediate supporting drum 18 similarly journaled in case 3, about which three drums the endless perforated belt 8 is trained for rotation therewith. To insure a positive drive to the belt 8, we additionally provide a drive belt 19 which closely underlies and engages the endless belt 8 and extends between the drive drum 11 and the intermediate drum 18, such drive belt being fabricated of an endless solid continuous sheet of rubber, preferably, or of canvas or fabric webbing, and serves the additional function of retaining balls 21 within the perforations 22 of the endless belt 8 immediately upon their deposition into the perforations 22 and until the termination of a read-out section 23 of the upper reach of belt 8 which extends between the top center of drive drum 11 and the top center of the intermediate drum 18. When the drive belt 19 passes out of engagement with perforated belt 8 adjacent to the top center of intermediate supporting drum 18, the removal of support causes the balls 21 to drop by force of gravity from the perforations of belt 8 and enter into ball-retaining hopper 9 guided by inclined integral guide section 24 of the hopper. In order to avoid spilling of the balls 21 from the hopper by accidental turning over of the case 3, we provide inclined overlapping baffles 26 and 27 within the hopper 9 extending from the inner sides of the opposite walls thereof. The hopper extends transversely of belt 8 between the upper and lower reaches thereof and is so constructed as to provide an inclined chute section 28 which directs the balls 21 which enter the hopper into a plurality of separate or individual compartments 29 defined by opposed interior partitions 31 and 32, see FIGS. 4 and 5, wherein the balls 21 are releasably retained in superposed vertical alignment in relation to one another. Each of the balls 21 preferably is fabricated of stainless steel for purposes of sanitation, although they all can be fabricated of a washable plastic substance, as desired. The outlets 33 of each compartment 31 are enlarged at one side to permit lateral movement of each of the balls 21 upon release thereof from the hopper 9, as indicated at 34.

In FIGS. 3 to 5 inclusive we have illustrated the means which we have provided in the embodiment of the invention shown in the annexed drawings for normally retaining the balls 21 in the individual compartments 31 of hopper 9 and for recurrently releasing same during the operation of the machine in order to build up or assemble replicas of delineated characters in any given work upon the upper reach of the endless belt 8 for retention thereof temporarily in read-out section 23 of the belt where a blind person may tactually sense and thus read such replicas. The means which we presently employ comprise a series of solenoids 36 which are supported on a bracket 36' below the lower reach of belt 8 and which are each contained in and actuated by pulsating direct current applied in each of an equal number of alternating current supplied armature circuits 7, see FIG. 11, upon the reduction in the light energy input to the transistors of such circuit when the photo-transistors 129 in sensor head 5 moves across ink or darkened areas of the pages of a text 46 on bookholder 4. The reverse occurs when the photo-transistors 129 scan an undarkened area of the text 46, thus removing the applied pulsating direct current so that the solenoids 36 are de-energized and the armature 37 of each solenoid is pulled outwardly from the solenoid coil and urged to its extreme outward position under the influence of the spring element 38 associated with each solenoid and fastened to the underside of one leg 39 of a bracket 41 secured to a side face of wall of case 3 to which a tube 42 is welded for slidably receiving a pin 43 which is retained in ball-supporting vertical position by element 38.

It is clear from the dotted line showings of FIG. 1 that a plurality of solenoids 36, with a similar number of similar armature circuits 7 into which the solenoids 36 are connected, are employed for effecting the releasable-retention of the balls 21 in individual compartments 29 into which the hopper 9 is conveniently divided. Further that upon re-energization of each solenoid during the scanning of each line of a text supported on the bookholder 4, as hereinafter explained, either one or a series of balls 21 are released from outlet 33 of each compartment 29 of hopper 9, depending upon the particular delineated character in the text that is scanned. This release of balls 21 from each compartment 29 of the hopper can be effected by the elements depicted in FIGS. 4 and 5 of the drawings from which it will be observed that a lowermost ball 21 in each of the stacks of balls which are fed by force of gravity in each compartment 29 initially moves laterally of the outlet 33 by virtue of the abutment 34 formed on the lower end of wall 32 of each compartment, and such lowermost ball 21 is supported momentarily in such displaced position, and within a perforation 22 of endless perforated belt 8 by an underlying ball 21' within the tube 42 and resting on the top of flat-headed pin 43.

Upon re-energization of any given solenoid or plurality of solenoids 36, the pin 43 drops by virtue of the downward pull on the spring metal element 38, thus permitting the ball to be retained solely in the perforation of the belt 8 with a segmental spherical portion 22' projecting below the lower reach of belt 8, see FIG. 5. When the disposed balls 21 in perforations 22 reach the drum 18 about which the drive belt 19 is trained, the drive belt in conjunction with the perforated belt 8 will hold the disposed balls partially within the perforations 22 of the latter belt. As the two belts 8 and 19 pass around drive drum 11 to become the upper reach of belt 8 with its read-out section 23, the segment 22' of each ball projects slightly above the belt 8 for tactual sensing by the fingers of the blind person. It is to be observed that the dimensions of the assembled or built-up replicas of the delineated characters of any scanned text will approximate the dimensions of the character in the text. Thus the built-up words — I read —, designated by the reference numeral 44 in FIG. 6 of the annexed drawings, are dimensional replicas of these same words contained in a book or other text placed upon work holder 4 and scanned by the photo-sensor head 5 during operation of the machine. At the termination of read-out section 23, with the upper reach of perforated belt 8 travelling from right to left, as indicated by the arrow 45, see FIG. 6, the drive belt 19 moves away from its engagement with the belt 8 and thus no longer serves to retain the balls 21 in the perforations 22 of belt 8 and, accordingly, they drop by force of gravity into the hopper 9, as clearly shown in FIG. 3.

In accordance with our present invention, we provide means for moving the photo-sensor 5 in a direction from left to right, as viewed in FIG. 6 or across the book holder 4, between extreme limits and, upon the completion of scanning of each line of a text, such as a book 46 supported on book holder 4, to return the sensor head to its initial position at the left margin of the delineated character lines in the text; the book holder being manually or otherwise moved away from the operator, or up an incline if the bookholder 4 is supported on an incline, to expose the succeeding line of the text for scanning by the photo-sensor head 5. The means which we conveniently employ to effect the movements aforesaid of the scanner or photo-sensor head 5 comprise the slidably mounted carriage 6 which is mounted for left and right movement with respect to the book 46 upon a platform 47 including a slide 48 supported on ball bearings 49 carried in platform 47 much in the same manner as a filing cabinet mount for a sliding drawer. A supporting arm 51 for the photo-sensor head 5 carries a clamp 52 on its outer end which encircles the photo-sensor head 5 and is hingedly connected by hinge 53 to the carriage 6 so that the head 5 may be swung upwardly away from the book 46 and latched in unused position to an upright 54 by raising lever 55 having a roller on its inner end riding upon link 55' and by pin 56 connected to the core or armature 7 of a solenoid 58 carried by the upright 54 and pivotally connected link 59 on arm 51, respectively. A tension spring 61 coiled about a rod 60 extending between link 54 and 58 normally serves to hold the photo-sensor head 5 in a position overlying the text 46 with casters 62 depending from head 5 and movably engaging the book pages during scanning operations. A hand-wheel 61' is provided for turning rod 60 and increasing the tension of spring 61.

Means for driving the carriage 6 with its photo-sensor 5 from left to right on book 46 preferably comprises primary motor 63, having its shaft 64 connected thru reduction drive 66 to a stub shaft 67 which is journaled in suitable bearings supported on the top 16 of the case 3, together with a second stub shaft 68 to which the carriage 6 may be engaged for movement in one linear direction. The means for returning the carriage 6 to its initial position at the left margin of the book 46 comprises a return motor 69 with suitable gear and gear belt drive between shaft 71 of motor 69 and the stub shaft 68. In addition, we provide an endless front gear belt 72, as viewed from the front 73 of case 3, and an endless rear gear belt 74 which are rotated in clockwise and counter-clockwise directions, respectively, by the motors 63 and 69, respectively, so as to move carriage 6 between extreme left and right positions governed by the left and right margins of the delineated characters of the text 46 being read by the blind person. The stub shaft 68 is journaled in suitable bearings 75 secured to the underside of the top 16 of case 3 and is driven from the main motor 63 by means of a gear 77 keyed to stub shaft 67 and a gear 78 keyed to a driven shaft 12 over which a gear belt 79 is trained for establishing driving connections between stub shaft 67 and driven shaft 12, which is connected to shaft 68 as hereinafter described.

Reduction gears 81 and 82 keyed to stub shaft 68 and an extension of drive shaft 12 respectively, together with an endless gear belt 83 trained over the two gears 81 and 82, effect clockwise rotation of stub shaft 68, while return motor shaft is rotated in a counter clockwise direction, and thus to move the belts 72 and 74 respectively, in corresponding directions. These movements are effected by keying to stub shaft 68 a bushing 84 carrying gear 86 and providing an idler bushing 87 on return motor shaft 71 in longitudinal alignment with gear 86 and over which the front gear belt 72 is trained to rotate only stub shaft 68 since idler bushing 87 is freely mounted on return motor shaft 71 and turns freely thereon. Similarly, we key a bushing 88 to return motor shaft 71 on which is carried a gear 89 and provide an idler bushing 91 carrying gear 92 on stub shaft shaft 68 in spaced relation to a bearing 93 in turn spaced from keyed bushing 84, and in longitudinal alignment with the gear 89; the endless rear gear belt 74 being trained over the two gears 89 and 92 with an additional shaft supporting bearing 94 for return motor shaft 71 secured to the under side of the top 16 of case 3 between the gear 86 and bushing 87 on shaft 71 as well as additional supporting bearing 95 and 95' on stub shafts 68 and 71, respectively, likewise secured to the under side of top 16 of casing 3 in alignment with one another, as shown. Upon starting main motor 63 with the sensor head 5 overlying the left margin of delineated characters in book 46, the sensor head 5 will be drawn slowly across the page of the book until it reaches the combined stop and switch 96 at the end of the line of characters at the right side of text 46 whereupon the circuit to motor 63 is broken by the closing of a right limit switch 96, while the circuit to return motor 68 is closed to cause the return shaft 71 to be rotated for effecting the return of carriage 6 and sensor head 5 to the left margin of delineated characters in text 46 where the left limit switch 97 is engaged to stop the return motor 68 and open the circuit 11 whereupon the cycle is repeated. As shown in FIGS. 8 to 10 inclusive as well as in FIG. 19, the carriage 6 for the photo sensor of our present invention is conveniently placed in driving connection with first one gear belt 72 and then the other gear belt 74 by means of a rocker arm 99 which is pivotally connected, as at 101 to a standard 102 depending from a lower platform 47'; the rocker arm carrying on the underside thereof at its longitudinal opposite extremities a pair of flat gear segments 103 and 104 which are caused to mesh with a portion of the lower reach of each gear belt 72 and 74 so that the movements of the gear belts in opposite directions will cause the carriage 6 to move correspondingly, depending upon whether the gear segment 103 or the gear segment 104 is placed in engagement with the gear belts 72 and 74. The raising and lowering of the gear segments 103 and 104 is controlled by the spring-loaded armature 106 of a solenoid 107 mounted on platform 47' and electrically connected into interconnection circuit 10, see FIG. 21; the sprıng 107' coiled around solenoid armature 106 serving to urge the segments 103 and 104 into firm engagement with the gears of the belts 72 and 74 when rocked into engagement therewith by the energization and de-energization of solenoid 107 which occurs upon the closing and opening of limit switches 96 and 97. The armature 106 can be secured by pin and slot connection, as indicated at 108 and 109, respectively, to the rocker arm 99.

In order to bring successive lines of delineated characters in text 46 to a scanning position underlying the path of travel of the photo-sensor head 5 across each page of the text, we preferably employ in the embodiment of our invention illustrated in the accompanying drawings, a conventional linear actuator which is generally designated by the reference numeral 111 and which per se is not a part of our invention and is commercially available under various trade names or trademarks, such as the "Roh'lix" linear actuator. This device essentially is a mechanical transducer, and may be manually operated or power driven as desired; the actuator 111 converting rotary motion into a linear motion and in the present embodiment is arranged for operation to move the bookholder 4 step by step from a position adjacent to the operator or front 73 of case 3 towards the rear of the case and extending beyond the same. As shown at the left of FIG. 15 and in FIG. 16, the linear actuator 111 comprises a relatively long shaft 112 which is journaled in a thrust bearing 113 secured to a bracket 114 mounted on the inside of front panel 73 of the case 3 and which extends nearly to the rear panel thereof. Additional bearings can be provided for supporting the shaft 112 for rotation; such bearings either being mounted in a bracket suspended within the case from the top 16 thereof or secured to an upright fastened to the floor or bottom of the case. Secured to an extension 112' of shaft 112 is a dial disc 116 having a finger opening 117 for effecting the easy rotation thereof by an operator or blind person; turning of disc 116 effecting a turning of actuator shaft 112 which carries by tight engagement with the shaft the linear actuator 111 per se. The actuator comprises two sections of which only the top section 118 is illustrated in FIG. 15 of the annexed drawings; the bottom section cooperating with the top section 118 for housing six free-wheeling rollers, not shown, three to an end, that are angled relative to the long axis of shaft 112 and spring-loaded by means of compression springs on posts 121 and 122 to urge the rollers, not shown, against the shaft. As the shaft turns, the rollers describe a helical path along the shaft and move the actuator forward and backward depending upon the direction of rotation of dial disc 116 and connected shaft 112. Screw-bolts 123 are provided for securing the actuator 111' to the under side of the book-holder 4 and thereby effects, by turning of the dial disc 116, the movement of book-holder away from the operator or toward the operator as desired.

Since the number of lines per inch in any given text carrying delineated characters will vary from, say, 4 lines per inch to 10 lines per inch, we have provided raised numerals 4, 4.5, 5, 5, 6, 7, 8 and 10 on the face of dial 16 which can be tactually sensed by the blind person. Upon being told what text he is about to read, he locates the raised numeral and turns the dial with the finger on say 10, until his finger engages a stop 124. And, per force, the turning movement of the shaft 112 and the linear movement of book holder 4 is accomplished. The raised numbers, as above mentioned, are delineated on dial 116 by a scale 125 on the face of the dial which shows the range of numbers of lines per inch of text and serves as a guide for the finger of the blind person and limited by the stop 124. The blind person can, after all the lines of a page of text 46 have been scanned which can be indicated to such blind person by the sounding of a buzzer, not shown, insert a finger in notch 117 and rotate the disc or dial 116 in the opposite direction to bring the book-holder 4 into its initial position with the top line of the next page of text 46 underlying the sensor head 5. This movement of the dial or disc 116 can also be done by placing the hand on the circumference of the disc.

As particularly illustrated in FIG. 17 of the annexed drawings, we provide a conventional photo-electronic scanning unit or sensor including a head 5 housing aligned lenses 126 and 127; the lens 126 conveniently constituting a 12 mm diameter, 24 mm FL double convex lens and the lens 127 constituting a 17 mm diameter, 50 mm FL double convex lens for projecting light energy from a source, such as one or more excitor lamps 128 which are adjustable in the usual manner to permit pre-adjustment of differential amplifiers, and which afford reflected light to a required light level from the pages of the text 46. The optical magnification afforded by the lenses 126 and 127, using focussed miniature excitor lamps 128 is sufficient to illuminate a relatively wide area within the head 5 wherein there may be accommodated a minimum of 11 photo-transistors 129, as shown, which are interconnected individually into each one of 11 amplifier circuits all similar to the amplifier circuit 7, see FIG. 11, by means of a series of energy conductors 131 conveniently encased in a flexible cable 132, see FIGS. 17 and 18 for preventing damage thereto upon to and from movement of the sensor head 5 on carriage 6. The moving sensor assembly provides sequential scanning and output indications of all segments of each character scanned, when the reflected light from the surface of a page of text 46 is lessened by the presence of the darker-than-page characters. Each of the arranged photo-transistors 129 in the scanning unit 5 is so placed as to sense its relative part of each character, and is connected to a related amplifier.

In FIG. 11 of the annexed drawings, we have diagrammatically illustrated one of the amplifier circuits 7 which, when its transistor voltage is increased by reduced light input from transistors 129 energizes the solenoid 36 to cause one or more of the balls 21 to be dropped from the outlet 33 of hopper 9 and to enter one or more of the perforations 22 of perforated belt 8, see FIG. 5. Thus, energization of the amplifier circuits 7 are controlled by the substantial reduction of the light input from the photo-transistors 129 in head 5, as indicated by the arrows 135 in FIG. 11. Circuit 7 has a 117 volt, alternating current supply, indicated at 7' which is reduced by transformer 134 to approximately 26 volts alternating current and then rectified by rectifier 136 to provide a pulsating direct current supply applied across the terminals of each solenoid 36 through the series connected silicon controlled rectifier 152.

Each of the amplifiers thus contains a minimum of low cost components and only one small regulated direct current supply, designated by the reference numeral 138 in FIG. 11 is used to supply direct current to each amplifier, and includes one integrated circuit regulator and several resistors and capacitors. The 20-volt direct current supply 138, and the reduced 26-volt alternating current rectified to pulsating direct current, indicated at 139 and 136 are common to all amplifiers; the power amplifier 152 consisting of a silicon-controlled rectifier which can easily be triggered into a heavily-saturated current conduction during the positive portion 141 of an alternating current cycle, and the conduction continues until the pulse returns to the zero voltage point on its wave form, see FIG. 12. No conduction normally could take place during the negative portion of the cycle. And, because the negative pulses occur in half the time, some signals might be lost during these periods of non-conduction. This possibility of lost data is corrected by applying the alternating current output of a low-voltage transformer secondary 139, to full-wave bridge type rectifier 136. The rectifier inverts the negative pulses and inserts them in the gaps between the former positive pulses 141, as shown in detail in FIG. 13, forming a continuous train of positive pulses and leaving a negligible time area of conduction in which the silicon-controlled rectifier cannot conduct.

The amplifier circuits 7 each functions as follows: the sensitivity of each photo-transistor 143 is adjusted to a suitable threshold of the reflected light by the setting of collector resistor 144; the resistor 146 serving to limit the maximum current applied to photo-transistor 143. When a darker portion of a given page of text 46 is scanned (as in the presence of an inked character) the light input decreases to photo-resistor 143 and the resistance of such photo-transistor increases, causing the voltage to rise at the emitter 147 of the unifunction transistor 148 at a frequency of several thousand cycles per second, much higher than the frequency of pulses shown in FIG. 13 and causing a train of short triggering pulses to appear at its lower base lead 149 which is connected to the gate terminal 151 of silicon-controlled rectifier 152. This high rate of trigger pulses applied to rectifier 152 drives it into saturated conduction early in one of the applied power pulses shown in FIG. 13, sufficient to operate the related solenoid armature 37 to release the related ball-drop mechanism. The function of diode 153, which is connected across the terminals of armature coil 36, is to protect the silicon-conductor rectifier 151 and the rectifier 136 from damage caused by induced voltages in the solenoid windings. A resistor 154 is connected to one terminal of the unijunction device 148 and provides operating bias for such unijunction device. The combination of resistor 154 and capacitance 156, connected across one terminal of photo-transistor 143 and the conductor leading to emitter terminal 147 of device 148, determines the frequency at which unijunction 148 operates as a relaxation oscillator. A resistor 157 is connected from the base 149 of device 148 to the negative lead 158 of the 26V pulsating direct current supply from rectifier 136 and provides common coupling of output impulses from unijunction transistor 148 to the gate 151 of silicon controlled rectifier 152, but holds such gate at a ground potential between gating pulses. When the rectifier 152 is triggered into conduction, its related solenoid 36 permits a ball to drop into place in one of the perforations 22 of perforated belt 8.

The interconnection circuit 10, see FIG. 21 likewise comprises well known, commercially available components arranged as shown for energizing relays for limit switches 96 and 97 and the coils of solenoids 58 and 107 in response to the opening and closing of such limit switches, as well as for starting and stopping motors 63 and 69 controlling respectively, the drive for perforated belt 8 and forward gear belt 72 as well as the return motor and return gear belt 74 in timed sequence, to move the photo-sensor head 5 first from left to right and then from right to left in the line by line screening of the pages of the text 46 on bookholder 4. Also, for effecting the operation of the ball-release solenoids 36 to drop the requisite number of balls 21 from hopper 9 and the deposition thereof in perforations 22 transversely of the endless perforated belt to build or assemble replicas of the characters delineated on the pages of the text 46, such as the words "I read" designated by the reference numeral 44. The circuit 10 is provided with a pair of holding coils 161 and 162 controlled by the diodes 163 and 164, respectively, to maintain current flow in the circuit despite the opening of limit switches 97 and 96, respectively, for recurrently stopping the primary motor 63 and starting return motor 69, and vice versa, during the sequential scanning of the lines of characters delineated in the pages of the text 46. Suitable resistors 166 and 167 as well as capacitors 168 and 169 are connected across the holding coils 161 and 162 which are fed from diodes 163 and 164, and across these holding coils and limit switches 97 and 96, respectively. A conventional solid state governor or motor speed control 171 is connected in series with primary motor 63 for controlling its speed as well as the moving belt assembly containing the bidirectional gear belts 72 and 74 and the solenoids 58 and 107. The power supply switch controls can be connected into circuit 10 on a suitable panel, designated generally by the reference numeral 172 for opening and closing the various circuits.

While any suitable means can be employed for movably mounting the bookholder 4, we preferably use the same type of mount as employed for movably mounting the sensor head and carriage 6. As shown at the lower left of FIG. 6, this mount for the bookholder includes a base 173 which is fashioned with races to receive a plurality of ball bearings 174 upon which a slidable member or carriage 176 is mounted and rides; such carriage 176 being directly connected onto and supporting the bookholder which in turn is fastened to the linear actuator 111.

The 117–120 volt alternating current supply for the interconnection circuit of our present embodiment of reading machine for the blind may comprise the conventional voltage regulator circuit 181, see FIG. 14 of the annexed drawings, wherein the output of the secondary of the transformer at approximately 24 volts alternating current is fed through a silicon bridge rectifier to provide the pulsating direct current for operating the integrated circuit voltage regulator which provides precisely regulated 20 volt dc for the operation of photo-transistors 143 and unijunction transistors 148.

It is to be understood that variations or modifications within the scope of our present concept are intended to be embodied in the subject of the appended claims.

We claim:

1. A reading machine for the blind comprising, in combination with a sheet on which lines of character are delineated, an endless belt having a plurality of circular perforations therein, means for moving said endless belt, a plurality of spherical bodies for removable placement and retention in some of said perforations and in partial relief in relation to said endless belt, and means for positioning said spherical bodies in said circular perforations in the form of a line of characters corresponding to a line of characters delineated on said sheet for tactile sensing by a blind person.

2. A reading machine for the blind as set forth in claim 1 wherein said endless belt has a read-out section in which said spherical bodies are removably retained for tactile sensing by a blind person, and a drive belt underlying said endless belt for holding said bodies in said read-out section of said endless belt and in partial relief in relation to said belt for tactile sensing by a blind person.

3. A reading machine as set forth in claim 2, wherein said drive belt moves away from underlying relation to said endless belt at one end of said read-out section of said endless belt to permit said spherical bodies to drop by force of gravity from said perforations, and a hopper for receiving and retaining said spherical bodies dropped from said endless belt at one end of said read-out section thereof.

4. A reading machine for the blind as set forth in claim 3, and a plurality of solenoids for releasably holding said spherical bodies in said hopper until released therefrom upon energization of said solenoids.

5. A reading machine for the blind as set forth in claim 4 and an electronic circuit containing said solenoids, and a plurality of light-responsive sensors each co-related with a separate solenoid connected into said electronic circuit to effect energization of said solenoids and release of said bodies from said hoppers onto said endless belt for the building of a line of characters thereon to be read by a blind person using the tactile sense.

6. A reading machine for the blind as set forth in claim 5, and means for actuating said sensors by scanning the characters delineated on said sheet.

7. A reading machine for the blind as set forth in claim 6 wherein said means comprise a plurality of fiber-optics conductors individually connected to each of said plurality of light-responsive sensors.

8. A reading machine for the blind comprising in combination with a sheet having successive lines of characters delineated thereon, a frame, a scanner movably mounted on said frame in overlying relation to said sheet, a sheetholder for supporting said sheet for scanning movably mounted on said frame for movement in directions at right angles to the directions of movement of said scanner, and a linear actuator including a shaft secured to said sheetholder for moving said sheetholder by predetermined step-by-step advancement so that successive lines of characters on said sheet may be scanned from the top line to the bottom line of said sheet after the completion of scanning of each complete line thereof, a rotatable disc mounted on an extension of said shaft, said disc having a finger opening therein for enabling facile rotation thereof, and a stop on said sheetholder extending partially across said disc to limit the extent of rotation thereof by the engagement of the finger of a hand with said stop; rotation of said disc effecting linear movement of said sheetholder and said actuator to and fro on the shaft thereof.

9. A reading machine for the blind comprising, in combination with a sheet having successive lines of characters delineated thereon, a frame, a sheet holder on said frame for supporting said sheet for scanning, a scanner movably mounted on said frame in overlying relation to said sheet, an electrical circuit, a primary motor connected into said circuit for driving said scanner in one direction of travel, and a return motor connected into said circuit for driving said scanner in an opposite direction of travel.

10. A reading machine for the blind as set forth in claim 9, a first limit switch in said circuit located at the extreme limit of travel of said scanner in one direction of travel, and a second limit switch in said circuit located at the extreme limit of travel of said scanner in the opposite direction; actuation of said limit switches occurring by engagement of said scanner therewith to stop said primary motor and start said return motor and vice-versa.

* * * * *